United States Patent
Herzig et al.

[11] Patent Number: 5,985,462
[45] Date of Patent: Nov. 16, 1999

[54] ORGANOSILICON COMPOUNDS HAVING SI-BONDED HYDROGEN ATOMS IN CROSSLINKABLE COMPOSITIONS

[75] Inventors: Christian Herzig, Waging am See; Elfriede Rieger, Simbach am Inn, both of Germany

[73] Assignee: Wacker-Chemie GmbH, Munich, Germany

[ * ] Notice: This patent is subject to a terminal disclaimer.

[21] Appl. No.: 08/881,410

[22] Filed: Jun. 24, 1997

[30] Foreign Application Priority Data

Sep. 12, 1996 [DE] Germany .............. 196 37 158

[51] Int. Cl.$^6$ .................................................. B32B 9/04
[52] U.S. Cl. .............................. 428/447; 528/15; 528/31
[58] Field of Search ................. 528/31, 15; 428/447

[56] References Cited

U.S. PATENT DOCUMENTS

| | | |
|---|---|---|
| 2,476,166 | 7/1949 | Wayo . |
| 3,445,420 | 5/1969 | Kookootsedes . |
| 3,615,272 | 10/1971 | Collins et al. . |
| 3,775,452 | 11/1973 | Karstedt . |
| 4,292,434 | 9/1981 | Lindner et al. . |
| 4,504,645 | 3/1985 | Melancon . |
| 5,047,492 | 9/1991 | Weidner et al. . |
| 5,097,054 | 3/1992 | Yamamoto et al. . |
| 5,241,034 | 8/1993 | Herzig et al. . |
| 5,691,435 | 11/1997 | Herzig et al. ............... 528/15 |

FOREIGN PATENT DOCUMENTS

| | | |
|---|---|---|
| 0 110 370 | 4/1987 | European Pat. Off. . |
| 0 367 222 | 5/1990 | European Pat. Off. . |
| 0 568 318 | 11/1993 | European Pat. Off. . |
| 0 694 573 | 1/1996 | European Pat. Off. . |
| 0 786 463 | 7/1997 | European Pat. Off. . |
| 1 955 511 | 5/1969 | Germany . |
| 37 16372 | 11/1988 | Germany . |

OTHER PUBLICATIONS

Patent Abstracts of Japan, 06107949, Publication Date Apr. 19, 1994.
Patent Abstracts of Japan, 06107671, Publication Date Apr. 19, 1994.
S. Rubinsztajn, Synthesis and Characterization of New Poly(siloxysilanes), Inorg. Organomet. Polym., 4(1), pp. 61–77, 1994Plenum Publishing Corporaiton, 1994.
S. Rubinsztajn, Synthesis and Characterization of New Poly(siloxysilanes), Inorg. Organomet. Polym., 4(1), pp. 61–77, 1994Plenum Publishing Corporaiton, 1994.
Chemical Abstract, vol. 122, 56637, 1995.
Carothers et al., "Polymers and Model Compounds from the Novel $B_2$ Monomer: 2,2–Dimethyl–6, 61–dimethylsiloxy–1–oxqa–2,6–disilacyclohexane", Polym. Prepr. vol. 34 (2), pp. 538–539 (1993).
Carothers et al., "Divergent and Convergent Synthesis of Hyperbranched Poly(siloxysilanes)", Polym. Prepr. vol. 34 (1), pp. 503–504 (1993).
Derwent Abstract corresponding to De 3716372, Nov. 1988.

*Primary Examiner*—Melvyn I. Marquis
*Attorney, Agent, or Firm*—Brooks & Kushman P.C.

[57] ABSTRACT

A novel crosslinkable composition comprising
(A) an organosilicon compound having radicals containing aliphatic carbon-carbon multiple bonds,
(B) an organosilicon compound having Si-bonded hydrogen atoms,
(C) a catalyst which promotes the addition of Si-bonded hydrogen onto aliphatic multiple bonds and, optionally,
(D) agents which retard the addition of Si-bonded hydrogen onto aliphatic multiple bonds at room temperature,
wherein the organosilicon compounds having Si-bonded hydrogen atoms (B) used are ones comprising
(a) on average per molecule, at least one structural unit of the formula $$-Z-SiR_x(OSiR_{3-a}H_a)_{3-x} \qquad (I),$$

where
R is an identical or different monovalent, optionally halogenated hydrocarbon radical which is free of aliphatic multiple bonds and has from 1 to 8 carbon atoms per radical,
Z is a divalent aliphatic hydrocarbon radical having from 2 to 12 carbon atoms per radical,
a is 1, 2 or 3, and
x is 0 or 1.

8 Claims, No Drawings

ORGANOSILICON COMPOUNDS HAVING SI-BONDED HYDROGEN ATOMS IN CROSSLINKABLE COMPOSITIONS

BRIEF SUMMARY OF THE INVENTION

The invention relates to crosslinkable compositions comprising
(A) an organosilicon compound having radicals containing aliphatic carbon-carbon multiple bonds,
(B) an organosilicon compound having Si-bonded hydrogen atoms,
(C) a catalyst which promote the addition of Si-bonded hydrogen onto aliphatic multiple bonds and, optionally,
(D) agents which retard the addition of Si-bonded hydrogen onto aliphatic multiple bonds at room temperature
and also the use of the crosslinkable compositions for producing coatings which repel sticky materials. The present invention also relates to organosilicon compounds having Si-bonded hydrogen atoms and a process for their preparation.

BACKGROUND OF THE INVENTION

Crosslinkers used for aliphatically unsaturated organopolysiloxanes are almost exclusively organopolysiloxanes containing hydrogenmethylsiloxane units, in the simplest case hydrogenmethylpolysiloxane end-blocked with triorganosiloxy groups. To increase the reactivity, it is useful to incorporate dimethylsiloxane units between the hydrogenmethylsiloxane units by equilibration. However, these measures are only limited improvements.

Apart from these crosslinkers based on hydrogenmethylsiloxane units, crosslinkers without methyl groups are also known. DE-B 1 955 511 and the corresponding U.S. Pat. No. 3,615,272 describe resins comprising hydrogensiloxane units, i.e., trifunctional units. However, such polymers are for restricted utility use as crosslinkers in addition-curing organopolysiloxane compositions since they hardly dissolve in the crosslinkable diorganopolysiloxanes.

EP-A 568 318 discloses organopolysiloxanes containing trifunctional siloxane units and monofunctional siloxane units containing Si-bonded hydrogen. According to EP-A 568 318, T units in the form of organosiloxane units are end-blocked with hydrogendimethylsiloxy groups, with a differing number of dimethylsiloxane or hydrogenmethylsiloxane units being incorporated between these groups.

According to DE-A 37 16 372, organopolysiloxanes containing Si-bonded hydrogen atoms and from 3 to 5 silicon atoms per molecule are prepared from $[H(CH_3)_2Si]_2O$ and trialkoxysilanes in a hydrolytic process.

Polym. Prepr. Vol. 34(2), 538 (1993) discloses that the self-cyclization of allyltris(dimethylsiloxy)silane is dominant when this compound reacts in dilute form under platinum catalysis.

Polym. Prepr. Vol. 34(2), 503 (1993) describes the self-cyclization. To avoid this, attempts are made to incorporate relatively long alkenyl groups into the monomeric compound of the formula alkenylSi$(R_2SiH)_3$. Isomerization of the ω-alkenyl double bond into an internal position takes place to an extent of from 15 to 16 mol % in the synthesis of the monomeric compound, as a result of which this percentage remains unreactive. In addition, the Si—H groups are further "diluted" because of the higher weight of $C_6H_{11}$ or $C_8H_{15}$ groups. The end products are unstable since the Si—H groups have to be protected to avoid gel formation.

According to Chemical Abstracts, Vol. 122, 56637, 1995, vinyltris(dimethylsiloxy)silane is prepared in a complicated process in which the volatile dimethyl-chlorosilane and the highly inflammable diethyl ether are required. In addition, auxiliary bases are needed for the work-up. The polymerization under various conditions forms self-polymers having average molecular weights of from 5,200 to 53,000 g/mol. Although hardly any cyclic products are formed, the polymerization can be controlled only with difficulty since the silane reacts strongly exothermically as soon as the platinum catalyst is added. The use as crosslinker is not described.

U.S. Pat. No. 5,097,054 describes a process for preparing compounds of the formula $R_{4-n}Si(OSiMe_2H)_n$, with only aliphatically saturated radicals and no aliphatically unsaturated radicals being described as radicals R.

DETAILED DESCRIPTION OF THE INVENTION

It is an object of the present invention to provide organosilicon compounds having Si-bonded hydrogen atoms which are prepared in a process whereby the number of the Si-bonded hydrogen atoms per molecule is increased in a simple manner, and which rapidly crosslink with organosilicon compounds having radicals containing aliphatic carbon-carbon multiple bonds in the presence of catalysts which promote the addition of Si-bonded hydrogen onto aliphatic multiple bonds, with higher crosslinking rates than previously achieved. A further object is to provide crosslinkable compositions which are suitable for producing coatings which repel sticky materials. These objects are achieved by the invention.

The present invention provides crosslinkable compositions comprising
(A) an organosilicon compound having radicals containing aliphatic carbon-carbon multiple bonds,
(B) an organosilicon compound having Si-bonded hydrogen atoms,
(C) a catalyst which promotes the addition of Si-bonded hydrogen onto aliphatic multiple bonds and, optionally,
(D) agents which retard the addition of Si-bonded hydrogen onto aliphatic multiple bonds at room temperature,
wherein the organosilicon compounds having Si-bonded hydrogen atoms (B) used are ones comprising
(a) at least one structural unit, preferably at least two structural units, of the formula

$$—Z—SiR_x(OSiR_{3-a}H_a)_{3-x} \qquad (I),$$

where
R is an identical or different monovalent, halogenated or unhalogenated hydrocarbon radical which is free of aliphatic multiple bonds and has from 1 to 8 carbon atoms per radical,
Z is a divalent aliphatic hydrocarbon radical having from 2 to 12 carbon atoms per radical,
a is 1, 2 or 3, preferably 1 or 2, more preferably 1, and
x is 0 or 1, preferably 0.

The organosilicon compounds having Si-bonded hydrogen atoms (B) used in the compositions of the invention are ones comprising
(A) at least one structural unit, preferably at least two structural units, of the formula

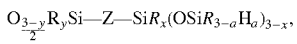 (I')

where
- R is an identical or different monovalent, halogenated or unhalogenated hydrocarbon radical which is free of aliphatic multiple bonds and has from 1 to 8 carbon atoms per radical,
- Z is a divalent aliphatic hydrocarbon radical having from 2 to 12 carbon atoms per radical,
- a is 1, 2 or 3, preferably 1 or 2, more preferably 1,
- x is 0 or 1, preferably 0, and
- y is 0, 1 or 2, preferably 1 or 2, more preferably 2, and, optionally,
(b) units of the formula

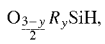 (II)

where
R and y are as defined above.

The organosilicon compounds having Si-bonded hydrogen atoms (B) according to the invention may also comprise (c) units of the formula

 (III)

where
R is as defined above, and
d is 1, 2 or 3, preferably 1 or 3.

The organosilicon compounds having Si-bonded hydrogen atoms (B) according to the invention may also comprise (d) carbon-containing structural units G
where
G is an identical or different divalent to decavalent hydrocarbon radical which has from 2 to 30 carbon atoms per radical and may also contain one or more heteroatoms selected from the group consisting of oxygen, boron, silicon, tin or titanium, with the proviso that at least two Si atoms are connected to one another via G, and
(e) units of the formula

 (IV)

and/or

 (IV')

where
R is as defined above, and
b is 0, 1 or 2, preferably 0,
with the proviso that b in formula (IV') is not 2, and with the proviso that the units of formula (IV) or (IV') are connected via the Si atoms to the carbon-containing structural units G.

The present invention further provides crosslinkable compositions wherein the organosilicon compounds having Si-bonded hydrogen atoms (B) used are those which can be prepared by reacting siloxanes (1) of the formula

where
$R^1$ is a monovalent aliphatic hydrocarbon radical having a terminal aliphatic double bond and from 2 to 12 carbon atoms per radical and
R, a and x are as defined above,
with organosilicon compounds (2) containing, on average per molecule, at least one Si-bonded hydrogen atom, in the presence of catalysts (3) which promote the addition of Si-bonded hydrogen onto aliphatic multiple bonds, where the ratio of Si-bonded hydrogen in organosilicon compound (2) to aliphatic double bonds in siloxane (1) is from 1:0.1 to 1:20.

Preferably, the organosilicon compounds (2) used are ones comprising
(b) on average per molecule, at least one unit of the formula

 (II)

where
R and y are as defined above.
The organosilicon compounds (2) can also comprise
(c) units of the formula

 (III)

where
R and d are as defined above.
The organosilicon compounds (2) can also comprise
(d) carbon-containing structural units G, where G is as defined above,
with the proviso that at least two Si atoms are connected to one another via G,
and
(e) units of the formula

 (IV)

and/or

 (IV')

where
R and b are as defined above,
with the proviso that the units of formula (IV) or (IV') are connected via the Si atoms to the carbon-containing structural units G.

The invention further provides organosilicon compounds having Si-bonded hydrogen atoms (B) comprising
(a) on average per molecule, at least one structural unit, preferably at least two structural units, of the formula

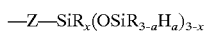 (I), where
R, Z, a and x are as defined above.
The organosilicon compounds having Si-bonded hydrogen atoms are preferably ones comprising (a) on average per molecule, at least one structural unit, preferably at least two structural units, of the formula

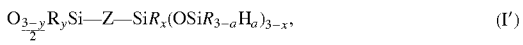  (I')

where
R, Z, a, x and y are as defined above, and optionally,
(b) units of the formula

  (II)

where
R and y are as defined above.

The invention further provides a process for preparing the organosilicon compounds having Si-bonded hydrogen atoms (B) according to the invention, which comprises reacting siloxanes (1) of the formula

where
R, $R^1$, a and x are as defined above,
with organosilicon compounds (2) containing, on average per molecule, at least one Si-bonded hydrogen atom, in the presence of catalysts (3) which promote the addition of Si-bonded hydrogen onto aliphatic multiple bonds, where the ratio of Si-bonded hydrogen in organosilicon compound (2) to aliphatic double bonds in siloxane (1) is from 1:0.1 to 1:20.

In the process of the invention, preference is given to using organosilicon compounds (2) comprising
(b) on average per molecule, at least one unit of the formula

  (II)

where
R and y are as defined above.

The invention further provides a process for preparing the siloxanes (1) of the formula

where
R, $R^1$, a and x are as defined above,
by reacting silanes (4) of the formula

with disiloxanes (5) of the formula

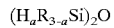

where
Y is an identical or different halogen atom or a radical of the formula $-OR^2$, where $R^2$ is an alkyl radical which has from 1 to 8 carbon atoms per radical and may be substituted by an ether oxygen atom, and
R, $R^1$, a and x are as defined above,
and water in the presence of hydrolysis-promoting catalysts (6), where the ratio of Si atoms in disiloxane (5) to hydrolyzable groups Y in silane (4) is from 0.8 to 5.0.

The organosilicon compounds having Si-bonded hydrogen atoms (B) according to the invention have a viscosity of from 5 to 200 mm$^2 \cdot$s$^{-1}$ at 25° C., preferably from 10 to 160 mm$^2 \cdot$s$^{-1}$ at 25° C. and more preferably from 25 to 160 mm$^2 \cdot$s$^{-1}$ at 25° C.

The organosilicon compounds having Si-bonded hydrogen atoms (B) according to the invention contain, on average per molecule, at least 5 Si-bonded hydrogen atoms, preferably from 5 to 50 Si-bonded hydrogen atoms, in particular from 10 to 50 Si-bonded hydrogen atoms, more preferably from 15 to 40 Si-bonded hydrogen atoms.

The organosilicon compounds having Si-bonded hydrogen atoms (B) according to the invention preferably comprise, on average per molecule, at least 2 structural units of formula (I), preferably at least 4 structural units of formula (I).

Surprisingly, self-addition of the siloxanes (1) to form cyclic products takes place to only a very small extent in the process of the invention for preparing the organosilicon compounds (B). Addition of the siloxanes (1) onto the organosilicon compound (2) takes place preferentially, which leads to an increase in the number of Si-bonded hydrogen atoms per molecule. Although one Si—H group per added-on siloxane molecule (1) is consumed for the addition onto $R^1$, at least two, preferably at least three, new Si—H groups are introduced. This effectively leads, on average, to an increase in the molecular weight and to an increase in the number of reactive Si—H groups per molecule. In addition, the compositions of the invention display good adhesion to a substrate.

The radical R in the organosilicon compounds having Si-bonded hydrogen atoms (B) is free of aliphatic multiple bonds so that no self-crosslinking which leads to insolubility takes place.

Examples of radicals R are alkyl radicals such as the methyl, ethyl, n-propyl, iso-propyl, 1-n-butyl, 2-n-butyl, iso-butyl, tert-butyl, n-pentyl, iso-pentyl, neo-pentyl or tert-pentyl radical; hexyl radicals such as the n-hexyl radical; heptyl radicals such as the n-heptyl radical; octyl radicals such as the n-octyl radical and iso-octyl radicals such as the 2,2,4-trimethylpentyl radical; cycloalkyl radicals such as cyclopentyl, cyclohexyl and cycloheptyl radicals and methylcyclohexyl radicals; aryl radicals such as the phenyl radical; alkaryl radicals such as o-, m- and p-tolyl radicals, xylyl radicals and ethylphenyl radicals and aralkyl radicals such as the benzyl radical, the α- and the β-phenylethyl radical. Preference is given to the methyl radical.

Examples of halogenated radicals R are haloalkyl radicals such as the 3,3,3-trifluoro-n-propyl radical, the 2,2,2,2',2', 2'-hexafluoroisopropyl radical, the heptafluoroisopropyl radical and haloaryl radicals such as the o-, m- or p-chlorophenyl radical.

Examples of radicals $R^1$ are alkenyl radicals such as the vinyl, allyl, 5-hexenyl, 7-octenyl or 9-decenyl radical, with preference being given to the vinyl radical.

Examples of alkyl radicals $R^2$ are the methyl, ethyl, n-propyl, iso-propyl, 1-n-butyl, 2-n-butyl, iso-butyl and tert-butyl radicals. Preference is given to the methyl or ethyl radical. Examples of alkyl radicals $R^2$ which are substituted by an ether oxygen atom are the methoxyethyl and ethoxyethyl radicals.

A preferred example of the halogen atom Y is the chlorine atom.

The radical Z is preferably a divalent, aliphatically saturated hydrocarbon radical having from 2 to 8 carbon atoms per radical.

Examples of radicals Z are those of the formulae $-CH_2CH_2-$, $-CH_2CH_2CH_2-$, $-(CH_2)_6-$, $-(CH_2)_8-$ and $-(CH_2)_{10}-$, with $-CH_2CH_2-$ being preferred.

A preferred example of the structural unit of formula (I') is that of the formula $O_{1/2}Me_2Si-CH_2CH_2-Si(OSiMe_2H)_3$ (Me=methyl radical).

A preferred example of the unit of formula (II) is that of the formula $O_{1/2}Me_2SiH$ (Me=methyl radical).

The carbon-containing structural unit G is preferably a divalent to decavalent aliphatically saturated hydrocarbon radical, preferably a trivalent to decavalent aliphatically saturated hydrocarbon radical.

As carbon-containing structural units G, preference is given to using radicals of the formula $$R^4 (CR^3H-CH_2-)_x$$

where $R^4$ is a divalent to decavalent aliphatically saturated hydrocarbon radical which has from 1 to 10 carbon atoms and may contain one or more heteroatoms selected from the group consisting of oxygen, boron, silicon, tin and titanium, $R^3$ is a hydrogen atom or an alkyl radical having from 1 to 6 carbon atoms per radical and x is 2, 3, 4, 5, 6, 7, 8, 9 or 10, preferably 3, 4, 5 or 6, more preferably 3.

Examples of alkyl radicals $R^3$ are the methyl, ethyl, n-propyl, iso-propyl, 1-n-butyl, 2-n-butyl, iso-butyl, tert-butyl, n-pentyl, iso-pentyl, neo-pentyl or tert-pentyl radical and hexyl radicals such as the n-hexyl radical. $R^3$ is preferably a hydrogen atom.

Examples of divalent carbon-containing structural units G are those of the formulae —CH$_2$CH$_2$—
—CH$_2$CH$_2$CH$_2$CH$_2$—
—(CH$_2$)$_6$—
—(CH$_2$)$_{10}$—
—(CH$_2$)$_3$O(CH$_2$)$_3$—
—CH$_2$CH$_2$—C$_6$H$_4$—CH$_2$CH$_2$— and
—CH$_2$CH$_2$Si (CH$_3$)$_2$CH$_2$CH$_2$—.

Examples of trivalent carbon-containing structural units G are those of the formulae (—CH$_2$CH$_2$)$_3$C$_6$H$_9$
(—CH$_2$CH$_2$)$_3$C$_6$H$_3$
(—CH$_2$CH$_2$CH$_2$OCH$_2$)$_3$C—CH$_2$CH$_3$
(—CH$_2$CH$_2$CH$_2$)$_3$B
(—CH$_2$CH$_2$)$_3$SiCH$_3$ and
(—CH$_2$CH$_2$)$_3$SnC$_4$H$_9$.

Examples of tetravalent carbon-containing structural units G are those of the formulae (—CH$_2$CH$_2$)$_4$C$_4$H$_4$
(—CH$_2$CH$_2$)$_4$Sn
(—CH$_2$CH$_2$)$_4$Ti
(—CH$_2$CH$_2$CH$_2$O)$_2$CH—CH(OCH$_2$CH$_2$CH$_2$—)$_2$ and

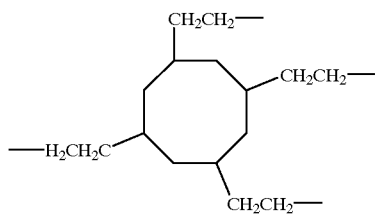

Higher-valent carbon-containing structural units G can be those of the formula (—CH$_2$CH$_2$)$_3$SiCH$_2$CH$_2$Si(CH$_2$CH$_2$—)$_3$ or saturated oligomers of dienes such as butadiene or isoprene.

Preferred carbon-containing structural units G are those having a valence of 3, 4, 5 or 6, preferably trivalent carbon-containing structural units.

Examples of siloxanes (1) used in the process of the invention for preparing the organosilicon compounds having Si-bonded hydrogen atoms (B) are
vinyltris(dimethylsiloxy)silane,
vinyltris(methylsiloxy)silane,
vinylmethylbis(dimethylsiloxy)silane,
vinylmethylbis(methylsiloxy)silane,
allyltris(methylsiloxy)silane,
5-hexenyltris(dimethylsiloxy)silane and
7-octenyltris(methylsiloxy)silane.

The siloxanes (1) have a molecular weight of from 200 to 400 g/mol and a viscosity of preferably at most 10 mm$^2$/s at 25° C.

Since the siloxanes (1) are prepared by hydrolytic methods from silanes and possibly disiloxanes, preferably from silanes (4) and disiloxanes (5), it is possible for them to contain up to about 10% by weight of compounds of the formula $$R^1R_xSi(OSiR_{3-a}H_a)_{2-x}-O-Si(OSiR_{3-a}H_a)_{2-x}R_xR^1,$$

i.e., dimers since 2 T units when x=0 or 2 D units when x=1 are condensed with one another. Although contamination of the siloxanes (1) with an even higher condensate in a low percentage of at most 3% by weight is not desirable, such siloxanes (1) can be used in the process of the invention for preparing the organosilicon compounds (B) of the invention.

In the process of the invention for preparing the siloxanes (1), preference is given to metering silane (4) into a mixture of disiloxane (5) and dilute acid, with water added to regulate the acid concentration. In the preparation of the siloxanes (1), the ratio of Si-atoms in disiloxane (5) to hydrolyzable groups Y in silane (4) is preferably from 0.8 to 2.5, more preferably from 1.0 to 1.5.

Optionally, excess disiloxane (5) is removed after the reaction, preferably by distillation.

The process for preparing the siloxanes (1) is carried out at a temperature of from 0° C. to 40° C., preferably from 5° C. to 20° C., and at the pressure of the surrounding atmosphere, i.e., at about 1020 hPa (abs.). However, the process can also be carried out at higher or lower pressures.

Examples of silanes (4) are vinyltrichlorosilane, allyltrichlorosilane, 5-hexenyltrichlorosilane, 7-octenyltrichlorosilane, 9-decenyltrichlorosilane, vinylmethyldichlorosilane, 5-hexenylethyldichlorosilane and 7-octenylmethyldichlorosilane.

Examples of disiloxanes (5) are 1,1,3,3-tetramethyldisiloxane, 1,3-dimethyldisiloxane and 1,3-diethyldisiloxane.

Examples of hydrolysis-promoting catalysts (6) are acids such as hydrochloric acid, hydrobromic acid, sulfuric acid, perchloric acid and organic acids such as trichloroacetic acid, trifluoroacetic acid and trifluoro-methanesulfonic acid, with hydrochloric acid being preferred. Preference is given to hydrochloric acid in a concentration of from 1% to 20%.

In the process of the invention for preparing the siloxane (1), water is preferably used in amounts of from 150 to 300 g per mole of Si-bonded hydrolyzable group Y in silane (4).

In the process for preparing the siloxanes (1), it is also possible to use inert solvents such as cyclohexane, toluene, xylene or heptane, but the use of solvents is not preferred. Any solvents used are removed after the reaction, preferably by distillation.

The organosilicon compounds (2) used in the process of the invention for preparing the organosilicon compounds having Si-bonded hydrogen atoms (B) comprise as preferred units of formula (II) those of the formula $HR_2SiO_{1/2}$ or $HRSiO_{2/2}$ (R is preferably a methyl radical), with units of the formula $HR_2SiO_{1/2}$ being more preferred. The organosilicon compounds (2) preferably contain from 3 to 20 Si-bonded hydrogen atoms. The organosilicon compounds (2) are preferably free of aliphatic multiple bonds.

Examples of organosilicon compounds (2) are phenylsilane, octylsilane, dodecylsilane, methyltris (dimethylsiloxy)silane, methyltris(diethylsiloxy)silane, propyltris(dimethylsiloxy)silane, phenyltris(dimethylsiloxy) silane, tetrakis(dimethylsiloxysilane), 1,3-dipropyl-1,1,3,3-tetrakis(dimethylsiloxy)disiloxane and 1,3-diphenyl-1,1,3,3-tetrakis(dimethylsiloxy)disiloxane.

Further examples of organosilicon compounds (2) are the organosilicon compounds having Si-bonded hydrogen atoms and a carbosiloxane structure which are described in the applicant's German application no. 196 02 663.6 and organopolysiloxanes of the formula

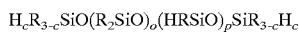

$$H_cR_{3-c}SiO(R_2SiO)_o(HRSiO)_pSiR_{3-c}H_c$$

where

R is as defined above, c is 0 or 1, o is 0 or an integer from 1 to 100, preferably 0 or an integer from 1 to 10, and p is 0 or an integer from 1 to 50, preferably 0 or an integer from 1 to 10.

In the process of the invention for preparing the organosilicon compounds having Si-bonded hydrogen atoms (B), the ratio of Si-bonded hydrogen in the organosilicon compound (2) to aliphatic double bonds in siloxane (1) is from 1:0.5 to 1:20, preferably from 1:0.5 to 1:10, more preferably from 1:0.5 to 1:5.

As catalysts (3) which promote the addition of Si-bonded hydrogen onto aliphatic double bonds, the process of the invention can also make use of the same catalysts which could also be used for promoting the addition of Si-bonded hydrogen onto aliphatic multiple bonds. The catalyst (3) is preferably a metal selected from the platinum metal group or a compound or a complex of a platinum group metal. Examples of such catalysts are metallic and finely divided platinum which can be present on a support such as silicon dioxide, aluminum oxide or activated carbon, compounds or complexes of platinum such as platinum halides, e.g. $PtCl_4$, $H_2PtCl_6*6H_2O$, $Na_2PtCl_4*4H_2O$, platinum-olefin complexes, platinum-alcohol complexes, platinum alkoxide complexes, platinum-ether complexes, platinum-aldehyde complexes, platinum-ketone complexes including reaction products of $H_2PtCl_6*6H_2O$ and cyclohexanone, platinum-vinylsiloxane complexes such as platinum-1,3-divinyl-1,1,3,3-tetra-methyldisiloxane complexes with or without a content of detectable inorganically bound halogen, bis (gammapicoline)platinum dichloride, trimethylenedipyridine-platinum dichloride, dicyclopentadiene-platinum dichloride, dimethylsulfoxyethylene-platinum(II) dichloride, cyclooctadieneplatinum dichloride, norbornadieneplatinum dichloride, gammapicolineplatinum dichloride, cyclopentadieneplatinum dichloride, and reaction products of platinum tetrachloride with an olefin and a primary or secondary amine or primary and secondary amine as described in U.S. Pat. No. 4,292, 434, for example the reaction product obtained from platinum tetrachloride dissolved in 1-octene and sec-butylamine, or ammonium-platinum complexes as described in EP-B 110 370.

In the process of the present invention for preparing the organosilicon compounds (B), the catalyst (3) is used in amounts of from 1 to 20 ppm by weight (parts by weight per million parts by weight), preferably in amounts of from 2 to 10 ppm by weight, in each case calculated as elemental platinum and based on the total weight of siloxane (1) and organosilicon compound (2).

The process of the invention for preparing the organosilicon compounds (B) is carried out at the pressure of the surrounding atmosphere, i.e., at about 1020 hPa (abs.), but it can also be carried out at higher or lower pressures. Furthermore, the process of the invention is carried out at a temperature of from 50° C. to 150° C., preferably from 50° C. to 120° C., more preferably from 80° C. to 120° C.

In the process of the invention, the organosilicon compound (2) is charged initially, optionally together with a small amount of siloxane (1), where the catalyst (3) is added and the siloxane (1) is metered in at elevated temperature.

In the process of the invention, it is possible to make concomitant use of inert, organic solvents, although the use of inert, organic solvents is not preferred. Examples of inert, organic solvents are toluene, xylene, octane isomers, butyl acetate, 1,2-dimethoxyethane, tetrahydrofuran and cyclohexane.

Any inert organic solvents used are removed by distillation after the reaction.

The process of the invention for preparing the organosilicon compound (B) can be carried out batchwise, semicontinuously or fully continuously.

The crosslinkable compositions of the invention comprising the organosilicon compounds having Si-bonded hydrogen atoms (B) are used for producing coatings which repel sticky materials, e.g., for producing anti-adhesive papers.

The self-adhesive materials associated with the anti-adhesive paper are produced by the off-line process or the in-line process. In off-line processes, the silicone composition is applied to the paper and crosslinked, then, in a subsequent stage, usually after rolling up the anti-adhesive paper to form a roll and after storing the roll, an adhesive film which is, for example, present on a label face paper is applied to the coated paper and the composite is then pressed together. In the in-line process, the silicone composition is applied to the paper and crosslinked, the silicone coating is coated with the adhesive, the label face paper is then applied to the adhesive and the composite is finally pressed together.

The organosilicon compounds having aliphatic carbon-carbon multiple bonds used as constituent (A) in the compositions of the invention can be the same compounds which could be used in all previously known crosslinkable compositions comprising organosilicon compounds having aliphatic carbon-carbon multiple bonds, organosilicon compounds having Si-bonded hydrogen atoms and catalysts which promote the addition of Si-bonded hydrogen onto aliphatic multiple bonds.

In the compositions of the invention, one type of constituent (A) or different types of constituent (A) can be used.

As organosilicon compounds (A) having radicals containing aliphatic carbon-carbon multiple bonds, preference is given to using linear or branched organopolysiloxanes comprising units of the formula $$R^5_e R^6_f SiO_{\frac{4-e-f}{2}} \quad (V)$$

where $R^5$ is a monovalent hydrocarbon radical which is free of aliphatic carbon-carbon multiple bonds and has from 1 to 18 carbon atoms per radical and $R^6$ is a monovalent hydrocarbon radical having at least one terminal aliphatic carbon-carbon multiple bond and from 2 to 12 carbon atoms per radical, e is 0, 1, 2 or 3,
f is 0, 1 or 2
and the sum of e+f is 0, 1, 2 or 3,
with the proviso that, on average, at least 1 radical $R^6$ is present per molecule, preferably at least 1.5 radicals $R^6$ per molecule, more preferably at least 2 radicals $R^6$ per molecule.

Preferred organosilicon compounds (A) are organopolysiloxanes of the formula $$R^6_g R^5_{3-g} SiO(SiR^5_2O)_n(SiR^5R^6O)_m SiR^5_{3-g} R^6_g \qquad (VI)$$

where
$R^5$ and $R^6$ are as defined above,
g are identical or different and are each 0, 1 or 2,
n is 0 or an integer from 1 to 1500 and
m is 0 or an integer from 1 to 200,
with the proviso that, on average, at least one radical $R^6$ is present per molecule, in particular at least 1.5 radicals $R^6$ per molecule, more preferably at least 2 radicals $R^6$ per molecule.

For the purposes of the present invention, formula (VI) is interpreted as meaning that n units —(SiR$^5_2$O)— and m units —(SiR$^5$R$^6$O)— can be distributed in any way in the organopolysiloxane molecule.

The organosilicon compounds (A) used can also be siloxane copolymers having alkenyl groups and comprising siloxane blocks and hydrocarbon blocks, as are described in U.S. Pat No. 5,241,034. The alkenyl-containing siloxane copolymers described in U.S. Pat No. 5,241,034 are therefore incorporated by reference into the present application.

The organosilicon compounds (A) used can also be organopolysiloxanes having aliphatically unsaturated hydrocarbon radicals, as are described in the applicant's German Patent Application 196 27 022.7. The organopolysiloxanes described in 196 27 022.7 comprise trifunctional (T) and/or tetrafunctional (Q) units having unsaturated hydrocarbon radicals. The organopolysiloxanes described in 196 27 022.7 are therefore incorporated by reference into the present application.

The organosilicon compounds (A) have an average viscosity of from 100 to 100,000 mPa·s at 25° C., preferably from 100 to 10,000 mPa·s at 25° C., more preferably from 100 to 500 mPa·s at 25° C.

Examples of hydrocarbon radicals $R^5$ are alkyl radicals such as the methyl, ethyl, n-propyl, iso-propyl, n-butyl, iso-butyl, tert-butyl, n-pentyl, iso-pentyl, neo-pentyl or tert-pentyl radical; hexyl radicals such as the n-hexyl radical; heptyl radicals such as the n-heptyl radical; octyl radicals such as the n-octyl radical and iso-octyl radicals such as the 2,2,4-trimethylpentyl radical; nonyl radicals such as the n-nonyl radical; decyl radicals such as the n-decyl radical, dodecyl radicals such as the n-dodecyl radical; octadecyl radicals such as the n-octadecyl radical; cycloalkyl radicals such as cyclopentyl, cyclohexyl and cycloheptyl radicals and methylcyclohexyl radicals; aryl radicals such as the phenyl, naphthyl, anthryl or phenanthryl radical; alkaryl radicals such as o-, m- and p-tolyl radicals, xylyl radicals and ethylphenyl radicals; and aralkyl radicals such as the benzyl radical, the α- or the β-phenylethyl radical.

Examples of radicals $R^6$ are alkenyl radicals such as vinyl, 5-hexenyl, 2,4-divinylcyclohexylethyl, 3,4-divinylcyclohexylethyl, 2-propenyl, 3-butenyl or 4-pentenyl radical; and alkynyl radicals such as the ethynyl or 2-propynyl radical.

The organosilicon compounds having Si-bonded hydrogen atoms (B) according to the invention can completely or partially replace the organosilicon compounds having Si-bonded hydrogen atoms (B) in the known crosslinkable compositions comprising (A) is an organosilicon compound having radicals containing aliphatic carbon-carbon multiple bonds,
(B) is an organosilicon compound having Si-bonded hydrogen atoms and
(C) a catalyst which promotes the addition of Si-bonded hydrogen onto aliphatic multiple bonds.

The crosslinkable compositions of the invention can comprise, as constituent (B), not only the organosilicon compounds (B) of the invention but also other known organosilicon compounds having Si-bonded hydrogen atoms.

Therefore, other organosilicon compounds having Si-bonded hydrogen atoms which can be concomitantly used are preferably organopolysiloxanes comprising units of the formula $$H_k R_l SiO_{\frac{4-(k+l)}{2}},$$

where
R is as defined above,
k is 0 or 1,
l is 0, 1, 2 or 3 and
the sum of k+l is not greater than 3,
more preferably those of the formula $$H_y R_{3-y} SiO(SiR_2O)_o(SiRHO)_p SiR_{3-y}H_y$$

where
R is as defined above,
y is 0 or 1,
o is 0 or an integer from 1 to 100 and
p is 0 or an integer from 1 to 100.

Examples of such organopolysiloxanes are copolymers comprising dimethylhydrogensiloxane, methylhydrogensiloxane, dimethylsiloxane and trimethylsiloxane units, copolymers comprising trimethylsiloxane, dimethylhydrogensiloxane and methylhydrogensiloxane units, copolymers comprising trimethylsiloxane, dimethylsiloxane and methylhydrogensiloxane units, copolymers comprising methylhydrogensiloxane and trimethylsiloxane units, copolymers comprising methylhydrogensiloxane, diphenylsiloxane and trimethylsiloxane units, copolymers comprising methyl- hydrogensiloxane, dimethylhydrogensiloxane and diphenylsiloxane units, copolymers comprising methylhydrogensiloxane, phenylmethylsiloxane, trimethylsiloxane and/or dimethylhydrogensiloxane units, copolymers comprising methylhydrogensiloxane, dimethylsiloxane, diphenylsiloxane, trimethylsiloxane and/or dimethylhydrogensiloxane units and copolymers comprising dimethylhydrogensiloxane, trimethylsiloxane, phenylhydrogen siloxane, dimethylsiloxane and/or phenylmethylsiloxane units.

Constituent (B) is used in amounts of from 0.8 to 5.0, preferably from 0.8 to 2.5, more preferably from 1.0 to 2.0, gram atoms of Si-bonded hydrogen per mole of Si-bonded radical having an aliphatic carbon-carbon multiple bond in constituent (A).

The catalysts (C) used in the compositions of the invention for promoting the addition of Si-bonded hydrogen onto aliphatic double bonds can be the same catalysts which could also be used for promoting crosslinking in the previously known compositions for crosslinking organosilicon compounds containing aliphatic multiple bonds with compounds containing Si-bonded hydrogen. Constituents (C) used are preferably the above mentioned catalysts (3).

The catalyst (C) is used in amounts of from 5 to 500 ppm by weight (parts by weight per million parts by weight), preferably from 10 to 200 ppm by weight, in each case calculated as elemental platinum metal and based on the total weight of the organosilicon compounds (A) and (B).

Examples of further constituents which can be concomitantly used in the compositions of the invention are agents which retard the addition of Si-bonded hydrogen onto aliphatic multiple bonds at room temperature, known as inhibitors (D), agents for adjusting the release force, solvents, coupling agents and pigments.

Inhibitors (D) which can be used in the compositions of the invention are all inhibitors which could also be used for the same purpose. Examples of inhibitors are 1,3-divinyl-1, 1,3,3-tetramethyldisiloxane, benzotriazole, dialkylformamides, alkylthioureas, methyl ethyl ketoxime, organic or organosilicon compounds having a boiling point of at least 25° C. at 1012 mbar (abs.) and at least one aliphatic triple bond as described in U.S. Pat. No. 3,445,420, for example 1-ethynylcyclohexan-1-ol, 2-methyl-3-butyn-2-ol, 3-methyl-1-pentyn-3-ol, 2,5-di-methyl-3-hexyne-2,5-diol and 3,5-dimethyl-1-hexyn-3-ol, 3,7-dimethyloct-1-yn-6-en-3-ol, inhibitors as described in U.S. Pat. No. 2,476,166, for example a mixture of diallyl maleate and vinyl acetate, and inhibitors as described in U.S. Pat. No. 4,504,645, for example monoesters of maleic acid, and inhibitors as described in the applicant's German application number 195 41 451.9, for example the compound of the formula $HC\equiv C-C(CH_3)(OH)-CH_2-CH_2-CH=C(CH_3)_2$, commercially available under the trade name "Dehydrolinalool" from BASF.

The inhibitor (D) is used in amounts of from 0.01% to 10% by weight, based on the total weight of the organosilicon compounds (A) and (B).

Examples for adjusting the release force of the coatings which repel sticky materials and are prepared using the compositions of the invention are silicone resins comprising units of the formulae $R^7(CH_3)_2SiO_{1/2}$ and $SiO_2$, known as MQ resins, where $R^7$ is a hydrogen atom, a methyl radical, a vinyl radical or a radical A which is described in the above-cited U.S. Pat No. 5,241,034 and is therefore incorporated by reference in the present application, and the units of the formula $R^7(CH_3)_2SiO_{1/2}$ can be identical or different. The ratio of units of the formula $R^7(CH_3)_2SiO_{1/2}$ to units of the formula $SiO_2$ is preferably from 0.6 to 2. The silicone resins are preferably used in amounts of from 5% to 80% by weight, based on the total weight of the organosilicon compounds (A) and (B).

Any solvents used in the compositions of the invention can be the same solvents used in the previously known compositions comprising organopolysiloxanes having Si-bonded vinyl groups, organopolysiloxanes having Si-bonded hydrogen and a catalyst which promotes the addition of Si-bonded hydrogen onto aliphatic double bonds. Examples of such solvents are naphthas, e.g., alkane mixtures having a boiling range from 80° C. to 110° C. at 1012 mbar (abs.), n-heptane, benzene, toluene and xylenes, halogenated alkanes having from 1 to 6 carbon atoms, for example methylene chloride, trichloroethylene and perchloroethylene, ethers such as di-n-butyl ether, esters such as ethyl acetate and ketones such as methyl ethyl ketone and cyclohexanone.

If organic solvents are used, they are used in amounts of from 10% to 95% by weight, based on the weight of the organosilicon compounds (A).

Although the order of mixing the constituents (A), (B), (C) and, if used, (D) is not decisive, it has been found to be useful in practice to add the constituent (C), i.e., the catalyst, last to the mixture of the other constituents.

The crosslinking of the compositions of the invention is carried out at from 50° C. to 150° C., preferably from 70° C. to 120° C. An advantage of the compositions of the invention is that rapid crosslinking is achieved even at low temperatures. Energy sources used for crosslinking by heating are ovens, e.g., convection drying ovens, heating channels, heated rollers, heated plates or infra-red rays.

Apart from heating, the compositions of the invention can also be crosslinked by irradiation with ultra-violet light. The ultraviolet light used usually has a wavelength of 253.7 nm. Many lamps which emit ultraviolet light having a wavelength of from 200 to 400 nm and which preferably emit ultraviolet light having a wavelength of 253.7 nm are commercially available.

The application of the compositions of the invention to the surfaces which are to be made anti-adhesive can be carried out in any manner which is suitable and known for producing coatings from liquid materials, for example by dipping, painting, casting, spraying, rolling on, printing, e.g., by means of an offset gravure coating apparatus, knife or blade coating or by means of an airbrush.

The surfaces which are to be made anti-adhesive and can be treated in the context of the invention can be surfaces of any materials which are solid at room temperature and 1012 mbar (abs.). Examples of such surfaces are those of paper, wood, cork and plastic films, polyethylene films or polypropylene films, woven and nonwoven textiles of natural or synthetic fibers or glass fibers, ceramic articles, glass, metals, polyethylene-coated paper and of cardboard, including cardboard made of asbestos. The polyethylene mentioned above can be high-, intermediate- or low-pressure polyethylene. Papers can be low-grade types of paper such as absorbent papers, including raw, i.e., not pretreated with chemicals and/or polymeric natural materials, kraft paper having a weight of from 60 to 150 g/m², non-sized papers, papers having a low degree of beating, wood-containing papers, non-gloss or machine-finished papers, papers which are smooth on one side as a result of the use of a drying and glazing cylinder in their production without further complicated measures and are therefore referred to as "single-side machine-glazed papers", uncoated papers or papers produced from waste paper, ie. recycled papers. The papers to be treated according to the invention can, of course, also be high-grade types of paper such as low-absorbency papers, sized papers, papers having a high degree of beating, wood-free papers, calendered or gloss papers, parchments, parchmented papers or precoated papers. The cardboards can also be high- or low-grade.

The compositions of the invention are suitable, for example, for producing anti-adhesive, covering and interleaving papers including interleaving papers which are used in the production of, for example, cast or decorative films or of foams, including those of polyurethane. Furthermore, the compositions of the invention are suitable, for example, for producing anti-adhesive, covering and interleaving cardboards, films and fabrics, for the coating of the reverse sides of self-adhesive tapes or self-adhesive films or the printed sides of self-adhesive labels. The compositions of the invention are also suitable for coating packaging materials such as those made of paper, cardboard boxes, metal foils and drums, e.g., cardboard, plastic, wood or iron, which are intended for the storage and/or transport of sticky goods such as adhesives, sticky foods, eg. cakes, honey, candy and meat, bitumen, asphalt, greased materials and raw rubber. A further example of the use of the compositions of the invention is the coating of substrates for transferring adhesive layers in the transfer process.

The compositions of the invention are suitable for producing the self-adhesive materials associated with the anti-adhesive paper both by the off-line process and by the in-line process.

EXAMPLE 1
Preparation of vinyltris(dimethylsiloxy)silane 858 g of 1,1,3,3-tetramethyldisiloxane are vigorously stirred with about 100 g of 5% strength HCl solution and cooled to about +10° C. At the same temperature, 565 g of vinyltrichlorosilane and about 2 l of water are metered in over a period of about 3 hours. The mixture is stirred further for 10 minutes and the HCl phase is then separated off. The latter is washed to approximate neutrality with 3×600 ml of water and the remaining acid is removed by means of a phosphate buffer (pH 7.0). The small excess of disiloxane is distilled out. Vinyltris (dimethylsiloxy)silane is separated from higher condensates under reduced pressure (about 70–75° C./14 hPa). This gives 833 g of $ViSi(OSiMe_2H)_3$ in a purity of almost 99%, corresponding to a yield of 85% of theory. Owing to the high reactivity, catalysts for hydrosilylation reactions must be kept away completely.

EXAMPLE 2
Preparation of 5-hexenyltris(dimethylsiloxy)silane

The procedure of Example 1 is repeated except that 242 g of 5-hexenyltrichlorosilane are used in place of vinyltrichlorosilane and 242 g instead of 858 g of 1,1,3,3-tetramethyldisiloxane are used. Distillation at 105–110° C./9 hPa gives 297 g (89% of theory) of 5-hexenyltris (dimethylsiloxy)silane.

EXAMPLE 3

At 25° C., 29.6 g of propyltris(dimethylsiloxy)silane are mixed with 8.4 g of vinyltris(dimethoxysiloxy)silane, whose preparation is described in Example 1, and then 45 mg of a 1% strength (based on platinum metal) solution of a platinum-1,3-divinyl-1,1,3,3-tetramethyldisiloxane complex in α,ω-divinyldimethylpolysiloxane, viz. the Karstedt catalyst which corresponds to the catalyst, as prepared according to U.S. Pat No. 3,775,452, are added. The mixture is heated to about 100° C., where a further 75.6 g of vinyltris(dimethylsiloxy)silane are metered in at 100° C. over a period of about 4 hours. Cooling to 25° C. gives a strongly branched siloxane having a viscosity of 13.2 mm$^2$/s at 25° C. and an average of 9 HMe$_2$SiO— groups per molecule. $H_2C=CH-Si-$ groups can be detected neither in the $^1$H-NMR spectrum nor in the $^{29}$Si-NMR spectrum. The product contains 7.9 g of Si-bonded hydrogen per kg.

EXAMPLE 4

Example 3 is repeated using a total of twice the amount of vinyltris(dimethylsiloxy)silane. The viscosity of the dendrimer is now 26.2 mm$^2$/s at 25° C., and it contains 7.6 g of Si-bonded hydrogen per kg and an average of 15 HMe$_2$SiO— groups per molecule.

EXAMPLE 5

Example 3 is repeated using 11.5 g of a siloxane having the average formula Me$_3$SiO(HMeSiO)$_3$SiMe$_3$ in place of the propyltris(dimethylsiloxy)silane. This gives a product having a viscosity of 55.4 mm$^2$/s at 25° C. It contains 7.3 g of Si-bonded hydrogen per kg and an average of 21 SiH groups per molecule.

EXAMPLE 6

Using the procedure of Example 3, vinyltris(dimethylsiloxy)silane is reacted in the same amounts with 26.7 g of 1,2-bis[tris(dimethylsiloxy)silanyl]ethane. The highly branched carbosiloxane having a viscosity of 29.4 mm$^2$/s at 25° C. contains 8.1 g of Si-bonded hydrogen per kg. The average molecule contains about 18 SiH groups.

EXAMPLE 7

37.0g of 1,2,4-tris[2-[tris(dimethylsiloxy)silanyl]ethyl] cyclohexane (mixture of stereoisomers) are mixed with 40 mg of a 1% strength (based on platinum metal) solution of Karstedt catalyst in silicone oil and with 6.6 g of vinyltris (dimethylsiloxy)silane and slowly heated under a nitrogen atmosphere. At about 100° C., a total of 60.6 g of vinyltris (dimethylsiloxy)silane is metered in over a period of 2 hours. This gives a strongly branched siloxane having an average of 21 hydrogendimethylsiloxy groups per molecule and a viscosity of 73 mm$^2$/s at 25° C.

EXAMPLE 8

Example 7 is repeated using 2.5 times the amount of vinyltris(dimethylsiloxy)silane. This gives a carbosiloxane polymer having a dendrimer structure and a viscosity of 128 mm$^2$/s at 25° C. The density of SiH functions is about 7.6 mol/kg.

COMPARATIVE EXPERIMENT 1

25 g of vinyltris(dimethylsiloxy)silane are mixed at 25° C. with 10 mg of the catalyst solution from Example 3 and slowly heated without organosilicon compound (2). Above about 50° C., a strongly exothermic reaction which can no longer be controlled commences and this leads to partial evaporation of the contents of the flask. Temperatures of above 200° C. are reached with partial decomposition of the product, which represents a considerable hazard potential. Target viscosities and degree of polymerization cannot be controlled.

EXAMPLE 9 AND COMPARATIVE EXPERIMENT 2

The following formulations were prepared:

|  | Example 9 | | Comparative Example 2 | |
|---|---|---|---|---|
|  | g | mequ | g | mequ |
| α, ω-Divinyl-PDMS | 40.00 | 10.80 | 40.00 | 10.80 |
| Dehydrolinalool | 0.09 | 0.60 | 0.09 | 0.60 |
| Carbosiloxane crosslinker 7 | 0.68 | 5.40 | — | — |
| Crosslinker B$^2$ | 0.70 | 10.80 | 1.05 | 16.20 |
| Platinum catalyst | 0.41 | | 0.41 | |

The α,ω-divinyldimethylpolysiloxane (=α,ω-divinyl-PDMS) has an average chain length of about 100 Si atoms.

Dehydrolinalool is obtainable from BASF and has a molecular weight of 152.

The carbosiloxane crosslinker 7 used is the siloxane having Si-bonded hydrogen atoms whose preparation is described in Example 7.

Crosslinker B$^2$ is a polymer comprising hydrogenmethylsiloxane units and having trimethylsilyl end groups and about 15.4 SiH groups/kg.

The platinum catalyst comprises Karstedt catalyst dissolved in α,ω-divinyldimethylpolysiloxane and contains 10 g of Pt (calculated as Pt metal) per kg of catalyst solution.

The concentration of Si-bonded hydrogen in each of the formulations is 1.5 times that of the C=C double bond. All formulations are applied to super-calendered paper in a thickness of about 4 µm and are then cured in a convection oven at 90° C. or a DSC (Differential Scanning Calorimetry) spectrum is recorded at 80° C. (isothermal).

|  | Example 9 | Comparative Experiment 2 |
|---|---|---|
| Curing at 90° C.: (time in sec.) |  |  |
| streak free | 6 | <20 |
| abrasion resistant | 6 | 20 |
| DSC peak after seconds | 340 | >1200 |
| Gel time (25° C.) | >76h | >76h |

At comparable gel times, the formulation of the invention cures far more quickly under processing conditions than does the comparative formulation.

EXAMPLE 10 AND COMPARATIVE EXPERIMENT 3

The formulations for Example 10 and Comparative Experiment 3 are prepared by making up the formulations as described in Example 9 and Comparative Experiment 2 with the modification that the 90 mg of dehydrolinalool are in each case replaced by 70 mg of 1-ethynylcyclohexanol. The batches which are in each case about 50 times that amount are compared by testing on a coating machine. The length of the drying oven is 4.5 m. The convection air temperature is 150° C. The coating is applied in a thickness of about 0.9 mm to super-calendered paper "Rhiliner 12"(from Rhinelander/USA). Immediately after curing, the uncrosslinked (extractable) fractions are determined by extraction with MIBK (=methyl isobutyl ketone) for a number of days and correlated with the respective line speed. % of extractable material

|  |  | % of extractable material | |
|---|---|---|---|
| Line speed [m/min] |  | Example 10 | Comparative Experiment 3 |
| 100 | (2.70)* | 3.3 | 7.8 |
| 150 | (1.80)* | 6.4 | 16.2 |
| 200 | (1.35)* | 12.0 | not cured |
| 250 | (1.08)* | not cured | not cured |

*) Residence time in the oven in seconds

Under identical conditions, the formulation of the invention is cured far better (lower proportion of extractable material). An acceptable limit of 5% of extractable material is, under the given conditions, reached by the conventional formulation at only 65 m/min, while the formulation of the invention can be run at faster than 100 m/min. 32

What is claimed is:
1. A addition-crosslinkable composition comprising
(A) an organosilicon compound having radicals containing aliphatic carbon-carbon multiple bonds,
(B) an organosilicon compound having Si-bonded hydrogen atoms, comprising
(a) on average per molecule, at least four structural units of the formula

$$-Z-SiR_x(OSiR_{3-a}H_a)_{3-x} \quad (I),$$

where
R is an identical or different monovalent, optionally halogenated, hydrocarbon radical which is free of aliphatic multiple bonds and has from 1 to 8 carbon atoms per radical,
Z is a divalent aliphatic hydrocarbon radical having from 2 to 12 carbon atoms per radical,
a is 1, 2 or 3 and
x is 0 or 1,
(C) a hydrosilylation catalyst which promotes the addition of Si-bonded hydrogen onto aliphatic multiple bonds and, optionally,
(D) agents which retard the addition of Si-bonded hydrogen onto aliphatic multiple bonds at room temperature.
2. A crosslinkable composition comprising
(A) organosilicon compounds having radicals containing aliphatic carbon-carbon multiple bonds,
(B) organosilicon compounds having Si-bonded hydrogen atoms,
(C) catalysts which promote the addition of Si-bonded hydrogen onto aliphatic multiple bonds and, optionally,
(D) agents which retard the addition of Si-bonded hydrogen onto aliphatic multiple bonds at room temperature,
wherein the organosilicon compounds having Si-bonded hydrogen atoms (B) used are ones which can be prepared by reacting
siloxanes (1) of the general formula $$R^1SiR_x(OSiR_{3-a}H_a)_{3-x}$$

where
R is an identical or different monovalent, optionally halogenated hydrocarbon radical which is free of aliphatic multiple bonds and has from 1 to 8 carbon atoms per radical,
$R^1$ is a monovalent aliphatic hydrocarbon radical having a terminal aliphatic double bond and from 2 to 12 carbon atoms per radical,
a is 1, 2 or 3 and
x is 0 or 1,
with organosilicon compounds (2) containing, on average per molecule, at least one Si-bonded hydrogen atom and which are free of aliphatic multiple bonds, in the presence of catalysts (3) which promote the addition of Si-bonded hydrogen onto aliphatic multiple bonds,
where the ratio of Si-bonded hydrogen in organosilicon compound (2) to aliphatic double bonds in siloxane (1) is from 1:0.1 to 1:20.
3. Coatings which repel sticky materials prepared by crosslinking the composition of claim 1.
4. An organosilicon compound having Si-bonded hydrogen atoms (B) comprising
(a) on average per molecule, at least one structural unit of the formula $$-Z-SiR_x(OSiR_{3-a}H_a)_{3-x} \quad (I),$$

where
R is an identical or different monovalent, optionally halogenated hydrocarbon radical which is free of aliphatic multiple bonds and has from 1 to 8 carbon atoms per radical,
Z is a divalent aliphatic hydrocarbon radical having from 2 to 12 carbon atoms per radical, a is 1, 2 or 3 and x is 1.

5. A process for preparing the organosilicon compounds having Si-bonded hydrogen atoms (B) as claimed in claim 4, which comprises reacting siloxanes (1) of the general formula $$R^1SiR_x(OSiR_{3-a}H_a)_{3-x}$$

where

R is an identical or different monovalent, optionally halogenated hydrocarbon radical which is free of aliphatic multiple bonds and has from 1 to 8 carbon atoms per radical, $R^1$ is a monovalent aliphatic hydrocarbon radical having a terminal aliphatic double bond and from 2 to 12 carbon atoms per radical, a is 1, 2 or 3 and x is 0 or 1, with organosilicon compounds (2) containing, on average per molecule, at least one Si-bonded hydrogen atom and which are free of aliphatic multiple bonds, in the presence of hydrosilylation catalysts (3) which promote the addition of Si-bonded hydrogen onto aliphatic multiple bonds, where the ratio of Si-bonded hydrogen in organosilicon compound (2) to aliphatic double bonds in siloxane (1) is from 1:0.1 to 1:20.

6. The process as claimed in claim 5, wherein the siloxane (1) used is vinyltris(dimethylsiloxy)silane.

7. The process as claimed in claim 5, wherein the siloxanes (1) of the formula $$R^1SiR_x(OSiR_{3-a}H_a)_{3-x}$$

where

R is an identical or different monovaent, optionally halogenated hydrocarbon radical which is free of aliphatic multiple bonds and has from 1 to 8 carbon atoms per radical, $R^1$ is a monovalent aliphatic hydrocarbon radical having a terminal aliphatic double bond and from 2 to 12 carbon atoms per radical, a is 1, 2 or 3 and x is 0 or 1, and are prepared by reacting silanes (4) of the formula $$R^1R_xSiY_{3-x}$$

with disiloxanes (5) of the formula $$(H_aR_{3-a}Si)_2O$$

where

Y can be identical or different and are each a halogen atom or a radical of the formula —$OR^2$, where $R^2$ is an alkyl radical which has from 1 to 8 carbon atoms per radical and may be substituted by an ether oxygen atom, and R, $R^1$, a and x are as defined above, and water in the presence of hydrolysis-promoting catalysts (6), where the ratio of Si atoms in disiloxane (5) to hydrolyzable groups Y in silane (4) is from 0.8 to 5.0.

8. A laminate comprising;

A. an adhesive layer,

B. a coating which repels sticky material prepared by crosslinking the composition of claim 1 by addition of the Si-bonded hydrogen atoms of component (B) to the aliphatic carbon-carbon multiple bonds of (A), and C. a substrate.

* * * * *